ly acidic substances such as phenol may be employed to provide an acidic medium for the reaction. Only a catalytic amount of acidic material is necessary. In general, amount of from about 0.01 to 5.0 percent based on the total weight of the reactants is sufficient.

United States Patent Office 3,382,270
Patented May 7, 1968

3,382,270
OLIGOMERS OF ALKYL AZIRIDINYL CARBOXYLATES
George E. Ham, Lake Jackson, Tex., assignor to The Dow Chemical Company, Midland, Mich., a corporation of Delaware
No Drawing. Filed Nov. 20, 1963, Ser. No. 325,160
14 Claims. (Cl. 260—471)

This invention relates to low molecular weight polymers and to their preparation. More particularly, the present invention relates to oligomers containing two, three, or four units and to the preparation of such oligomers by the reaction of an alcohol, an organic acid, or a phenol with an alkyl 1-aziridinylcarboxylate (including carboxylates wherein the aziridinyl group contains substituents in the 2 and 3 positions) under acid conditions.

The reaction of thiophenol, benzoic acid, hydrochloric acid, and picric acid with alkyl 1-aziridinylcarboxylates is discussed by Iwakura et al. in the Journal of Organic Chemistry, 26, 4384–8 (1961). In the Iwakura process, however, either carbamates with a single nitrogen atom in the molecule are produced or substituted urea products with two nitrogen atoms result. Furthermore, the similar reaction of certain alcohols with alkyl 1-aziridinylcarboxylates at temperatures of up to 100° C. is disclosed in a copending application by Ham et al.

It has now been found that at least two moles of an alkyl aziridinylcarboxylate may be reacted with each mole of a member selected from the group consisting of an alkanol, organic acid, and phenol in the presence of an acidic catalyst using a substantially non-aqueous reaction media to produce low molecular weight oligomers containing from 2 to 4 nitrogen atoms. The reaction by which the novel compounds are produced may be represented by the equation:

(A)
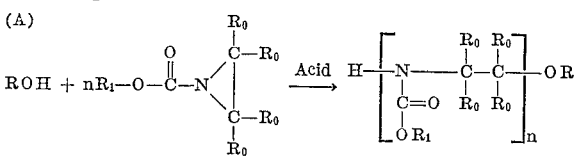

wherein R is an alkyl, aryl, or acyl group of from 1 to 10 carbon atoms, $n$ is an integer from 2 to 6 inclusive (preferably 2 to 4), each $R_0$ is a hydrogen atom or a lower alkyl group of from 1 to 4 carbon atoms, and each $R_1$ is a lower alkyl group of from 1 to 4 carbon atoms. When mixtures of oligomers are obtained in the reaction product, the individual compounds may be separated by vacuum distillation or by chromatographic methods. When R is an acyl group, it is desirably of the formula:

wherein $R_3$ is an alkyl group of from 1 to 4 carbon atoms.

Typical starting materials include formic acid, acetic acid, propionic acid, butyric acid, benzoic acid, phenol, the cresols (o-, m-, and p-methylphenol), methanol, ethanol, n-propanol, i-propanol, pentanols, hexanols, heptanols, octanols, nonanols, and decanols. These materials may be reacted with methyl 1-aziridinylcarboxylate, methyl 2,3-dimethyl-1-aziridinylcarboxylate, ethyl 2-methyl-1-aziridinylcarboxylate, ethyl 2-n-butyl-1-aziridinylcarboxylate, and ethyl 2-i-propyl-1-aziridinylcarboxylate to produce the corresponding carbamate oligomers.

The acidic catalyst may be a Lewis acid (electron acceptor which behaves as a proton) such as $BF_3$, $BCl_3$, $SnCl_4$, $ZnCl_2$, and $AlCl_3$ or a conventional acid (or other acidic substance which furnishes a solvated proton) such as HCl, $H_2SO_4$, chloroacetic acid, acetic acid, etc. In addition, weakly acidic substances such as phenol may be employed to provide an acidic medium for the reaction. Only a catalytic amount of acidic material is necessary. In general, amount of from about 0.01 to 5.0 percent based on the total weight of the reactants is sufficient.

The reaction may be carried out at temperatures of from about 25° C. to 150° C., usually under reflux conditions. The pH of the reaction mixture should be less than 7 and preferably less than about 4. The reaction may be carried out continuously by constant addition of fresh starting materials and catalyst, or may be carried out batchwise. Pressures of from a few hundredths of a millimeter of mercury up to several hundred atmospheres may be used. No advantage is obtained by the use of excessively high pressures and the reaction is most advantageously carried out at atmospheric pressure. When an organic acid is the reactant, no additional acidic catalyst is necessary, but may be added if desired. As a suitable final step, the mixture is heated at a pressure below 2 mm. of Hg using temperatures above about 150° C. (150° to about 350° C.).

The compounds of the invention are useful as bactericides, for example, for the control of *Aerobacter aerogenes*. Either the pure compounds or mixtures of different oligomers may be used. When cross streaks of *Aerobacter areogenes* and the compounds of the invention were made on nutrient agar in a Petri dish, followed by incubation for 72 hours at 25° C., no growth was observed at the intersection of the contaminant and the compound. In all other inoculated areas, growth was abundant. The compounds of the invention are also useful in applications requiring compounds with ester groups, for example, as additives to synthetic polyester lubricants to provide additional emulsifying action.

The following examples are submitted for the purpose of illustration only and are not to be construed as limiting the scope of the invention in any way.

*Example I (general procedure)*.—Into a reaction vessel equipped with a means for stirring, temperature control and refluxing was placed 46 grams of ethyl 1-aziridinyl formate (EAF), 100 milliliters of methyl alcohol and 0.55 milliliter (1.0 gram) of concentrated $H_2SO_4$. The mixture was stirred at 25° C. for 30 minutes, the acid neutralized with methanolic KOH, the mixture filtered and the excess methyl alcohol was removed under reduced pressure. There was obtained 51.9 grams of a clear liquid which was distilled under reduced pressure and 8.78 grams of product were recovered. This product boiled at 165° C. at 0.3 mm. of Hg and was found to have the following structure:

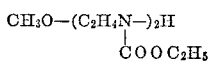

The yield was 16.7% of theory.

*Analysis*.—Calculated percent as ($C_{11}H_{22}O_5N_2$): C, 50.37; H, 8.45; N, 10.68. Found percent: C, 50.57; H, 8.63; N, 10.81.

Properties: $\eta_D^{20} = 1.4575$; $D^{20} = 1.082$.

Molar refraction: found, 66.09; calculated, 65.12.

A second fraction consisting of 4.25 grams which boiled higher than 200° C. at 1 mm. of Hg was obtained. In this fraction the value of $n$ in Formula A was found to by 4 by end group analysis for NH. The infrared spectrum was consistent with the expected structure.

The average composition of this material was thus shown to be an oligomer wherein $n$ was about 4.

*Example II*.—The same procedure and equipment as in Example I was used. The reaction mixture was composed of:

(a) 23.0 grams of EAF (0.20 mole),
(b) 12.0 grams of acetic acid (0.20 mole), and
(c) 150 milliliters of acetonitrile.

The mixture was refluxed for 2½ hours at about 80° C. The solvent and any excess acid were removed under reduced pressure. The residue was then distilled under reduced pressure and there was obtained 6.07 grams (21% of theory) of $$CH_3COO\text{—}(C_2H_4N)_2H$$
$$|$$
$$COOC_2H_5$$

Boiling point=150° to 160° C. at 0.2 mm. $\eta_D^{20}$=1.4615; $D^{20}$=1.152.

The infrared spectrum was consistent for the above formula. There was also obtained 2.42 grams of a fraction boiling greater than 200° C. at 0.2 mm. of Hg. The infrared spectrum was for a like structure wherein $n$ (Formula A) was greater than 2.

The average composition of the oligomer was that corresponding to a value of 2.5 for $n$ based upon unreacted acetic acid.

*Example III.*—The procedure of Example I was used. The reaction mixture was composed of:
  (a) 23.0 grams of EAF (0.20 mole),
  (b) 36.0 grams of acetic acid (0.60 mole), and
  (c) 200 milliliters of acetonitrile.

The mixture was refluxed for 195 minutes. There was obtained 5.15 grams (17.8% of theory based on EAF) of:

$$CH_3COO\text{—}(\text{—}C_2H_5N\text{—})_2H$$
$$|$$
$$COOC_2H_5$$

The product had the same properties as the corresponding product of Example II.

The infrared spectrum was consistent for the above formula. There was also obtained 3.88 grams of a fraction boiling greater than 200° C. at 0.2 mm. of Hg. The infrared spectrum was consistent for a like structure wherein $n$ was greater than 2.

*Example IV.*—The procedure of Example I was used. The reaction mixture was composed of:
  (a) 23.0 grams of EAF (0.20 mole),
  (b) 18.8 grams of phenol, and
  (c) 150 milliliters of acetonitrile.

The mixture was refluxed at 80° C. (7 days). The solvent was removed under reduced pressure and there was obtained 7.78 grams of a clear viscous liquid. The boiling point was greater than 194° C. at 0.1 mm. of Hg. The product was:

$$H\text{—}C_6H_4\text{—}O\text{—}(\text{—}C_2H_4N\text{—})_2H$$
$$|$$
$$COOC_2H_5$$

The infrared spectrum was consistent for the above formula.

*Example V.*—(1:1 mole ratio.) The procedure of Example I was used. Reaction mixture:
  (a) 23.0 grams of EAF (0.2 mole),
  (b) 9.2 grams of ethyl alcohol (0.2 mole),
  (c) 150 milliliters of acetonitrile, and
  (d) 1.0 milliliter of BF$_3$ etherate (47 percent by weight of BF$_3$ in diethyl ether).

The reaction mixture was refluxed for 2 hours at 80° C. There was obtained 5.52 grams (20% yield) of product. Boiling point=146–150° C. at 0.5 mm. Hg. The infrared spectrum was consistent for the structural formula:

$$C_2H_5\text{—}O\text{—}(C_2H_4\text{—}N\text{—})_2H$$
$$|$$
$$COOC_2H_5$$

$\eta_D^{20}$=1.4600; $D^{20}$=1.134.

There was also obtained 8.02 grams of a fraction boiling above 250° C. at 0.5 mm. of Hg. The infrared spectrum of this product was consistent for a like structure wherein $n$ (Formula A) was greater than 2.

By end group analysis for NH, a value of 3.54 was obtained for $n$.

*Example VI.*—(3:1 mole ratio.) The procedure of Example I was used. Reaction mixture:
  (a) 23.0 grams of EAF,
  (b) 27.6 grams of ethyl alcohol,
  (c) 150 milliliters of acetonitrile, and
  (d) 1.0 milliliter of BF$_3$ etherate.

The reaction mixture was refluxed for 1.75 hours at 80° C. There was obtained 5.37 grams (19.4% of theory) of product with a boiling point of 146–150° C. at 0.5 mm. of Hg.

The compound had the same structure as that of Example V with a second fraction having a calculated $n$ (Formula A) of 3.04.

I claim as my invention:

1. A compound of the formula:

$$H\text{—}\left[\text{—}N\text{—}\underset{\underset{OR_1}{|}}{\overset{\overset{R_0}{|}}{C}}\text{—}\right]_n OR$$
$$\phantom{H\text{—}}\overset{|}{C}{=}O\ R_0$$

wherein
  (a) R contains from 1 to 10 carbon atoms and is selected from the group consisting of an alkyl group, a phenyl, o-methylphenyl, m-methylphenyl or p-methylphenyl group and an acyl group derived from an alkyl or an aryl carboxylic acid;
  (b) each $R_0$ is selected from the group consisting of a hydrogen atom and a lower alkyl group of from 1 to 4 carbon atoms;
  (c) each $R_1$ is an alkyl group of from 1 to 4 carbon atoms; and
  (d) $n$ is an integer from 2 to 6.

2. A compound of the formula $$H\text{—}\left[\text{—}N\text{—}CH_2CH_2\text{—}\right]_n OR$$
$$\phantom{H\text{—}}\overset{|}{C}{=}O$$
$$\phantom{H\text{—}}\overset{|}{O}\text{—}CH_2CH_3$$

wherein
  (a) R contains from 1 to 10 carbon atoms and is selected from the group consisting of an alkyl group, a phenyl, o-methylphenyl, m-methylphenyl or p-methylphenyl group and an acyl group derived from an alkyl or an aryl carboxylic acid; and
  (b) $n$ is an integer from 2 to 6.

3. A compound of the formula:

$$H\text{—}\left[\text{—}N\text{—}CH_2CH_2\text{—}\right]_n\text{—}O\text{—}C_6H_4\text{—}H$$
$$\phantom{H\text{—}}\overset{|}{C}{=}O$$
$$\phantom{H\text{—}}\overset{|}{O}\text{—}CH_2CH_3$$

wherein $n$ is an integer from 2 to 6.

4. A compound of the formula:

$$H\text{—}\left[\text{—}N\text{—}CH_2CH_2\text{—}\right]_n OR_2$$
$$\phantom{H\text{—}}\overset{|}{C}{=}O$$
$$\phantom{H\text{—}}\overset{|}{O}\text{—}CH_2CH_3$$

wherein $R_2$ is an alkyl group of from 1 to 10 carbon atoms, and $n$ is an integer from 2 to 6.

5. A compound of the formula:

$$H\text{—}\left[\text{—}N\text{—}CH_2CH_2\text{—}\right]_n\text{—}O\text{—}\overset{\overset{O}{\|}}{C}\text{—}R_3$$
$$\phantom{H\text{—}}\overset{|}{C}{=}O$$
$$\phantom{H\text{—}}\overset{|}{O}\text{—}CH_2CH_3$$

wherein $R_3$ is an alkyl group of from 1 to 4 carbon atoms, and $n$ is an integer from 2 to 6.

6. The compound:

$$H\text{—}\left[\text{—}N\text{—}CH_2CH_2\text{—}\right]_2\text{—}O\text{—}CH_3$$
$$\phantom{H\text{—}}\overset{|}{C}{=}O$$
$$\phantom{H\text{—}}\overset{|}{O}\text{—}CH_2CH_3$$

7. The compound:

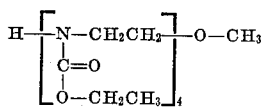

8. The compound:

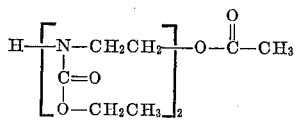

9. The compound:

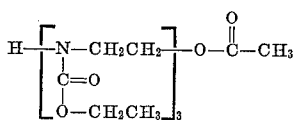

10. The compound:

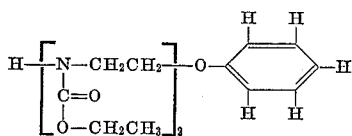

11. The compound:

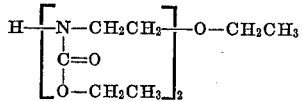

12. The compound:

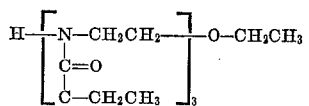

13. The compound:

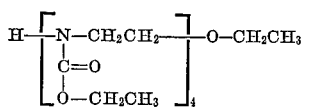

14. A method of preparing oligomers of alkyl aziridinyl-carboxylates which comprises reacting at a temperature of from about 25° to 150° C. at a pH less than 7 in the presence of an acid catalyst (I) at least two moles of a compound of the formula:

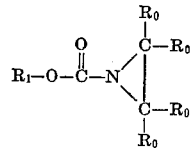

per mole of
(II) a compound of the formula:

$$ROH$$

wherein
(a) R is a monvalent group of from 1 to 10 carbon atoms selected from the group consisting of an alkyl group, a phenyl, o-methylphenyl, m-methylphenyl or p-methylphenyl group and an acyl group derived from an alkyl or an aryl carboxylic acid;
(b) each $R_0$ is selected from the group consisting of a hydrogen atom and a lower alkyl group; and
(c) $R_1$ is an alkyl group of from 1 to 4 carbon atoms.

References Cited
UNITED STATES PATENTS

| | | | |
|---|---|---|---|
| 3,034,949 | 5/1962 | Ryker | 167—22 |
| 3,062,870 | 11/1962 | Mehta et al. | 260—482 |
| 3,070,491 | 12/1962 | Heusch et al. | 167—22 |
| 3,106,576 | 10/1963 | Kaiser et al. | 260—471 |
| 3,125,598 | 3/1964 | Kuhl et al. | 260—471 |
| 3,133,959 | 5/1964 | Seifter et al. | 260—482 |

FOREIGN PATENTS

| | | |
|---|---|---|
| 726,257 | 3/1932 | France. |

LORRAINE A. WEINBERGER, *Primary Examiner.*

J. LEVITT, *Examiner.*

G. A. MENTIS, L. A. THAXTON, *Assistant Examiners.*